United States Patent
Humphrey et al.

(10) Patent No.: US 10,698,467 B2
(45) Date of Patent: Jun. 30, 2020

(54) EMERGENCY POWER OFF DEVICES

(71) Applicant: Hewlett Packard Enterprise Development LP, Houston, TX (US)

(72) Inventors: Daniel Humphrey, Tomball, TX (US); Stewart Gavin Goodson, II, Houston, TX (US); Mark Rivera, Cypress, TX (US); Gennadiy Rozenberg, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 143 days.

(21) Appl. No.: 15/912,670

(22) Filed: Mar. 6, 2018

(65) Prior Publication Data

US 2019/0278353 A1    Sep. 12, 2019

(51) Int. Cl.
| | | |
|---|---|---|
| *G06F 1/30* | (2006.01) | |
| *H02J 9/04* | (2006.01) | |
| *G06F 1/26* | (2006.01) | |

(52) U.S. Cl.
CPC .................. *G06F 1/30* (2013.01); *H02J 9/04* (2013.01); *G06F 1/266* (2013.01)

(58) Field of Classification Search
CPC ....................................................... G06F 1/30
See application file for complete search history.

(56) References Cited

U.S. PATENT DOCUMENTS

| | | | |
|---|---|---|---|
| 8,539,274 B2 | 9/2013 | Atkins et al. | |
| 8,670,872 B2 | 3/2014 | Rasmussen et al. | |
| 9,007,762 B2 | 4/2015 | Toya | |
| 9,141,164 B2 | 9/2015 | Bailey et al. | |
| 2002/0069371 A1* | 6/2002 | Teeling | G06F 1/30 713/300 |
| 2018/0159343 A1* | 6/2018 | Chen | H02J 3/01 |

OTHER PUBLICATIONS

IBM; "Computer Room Emergency Power Off"; Jun. 17, 2014; 2 pages.

* cited by examiner

*Primary Examiner* — Albert Wang
(74) *Attorney, Agent, or Firm* — Brooks, Cameron & Huebsch, PLLC (57) ABSTRACT

In some examples, an Emergency Power Off (EPO) device can be connected to a non-EPO port of a computing device, and the EPO device can provide an EPO signal via the non-EPO port to a manager connected to an energy storage device of the computing device, wherein the EPO signal comprises instructions to power off the energy storage device.

12 Claims, 5 Drawing Sheets

EMERGENCY POWER OFF DEVICES

BACKGROUND

An Emergency Power Off (EPO) is a safety mechanism used to shut off power to devices utilizing power in the event of an emergency and/or when the device cannot be shut down using routine protocols. Unlike a routine shut down procedure, an EPO is designed to abort the operation of the device by physically disconnecting an electrical connection to the device.

DETAILED DESCRIPTION

An Emergency Power Off (EPO) is a safety mechanism used to shut off power to devices utilizing power in the event of an emergency and/or when the device cannot be shut down using routine protocols. Unlike a routine shut down procedure, an EPO is designed to abort the operation of the device by physically disconnecting an electrical connection to the device. A number of systems and devices for an EPO are described herein. The United States National Electric Code maintains that EPO functions be present for back-up battery systems that run equipment of 750 Volt-Amps (VA) or greater. Low-powered equipment (e.g. equipment powered using less than 750 VA) may be permitted to operate, however this may greatly limit the features available to the equipment, as small (e.g. low-powered) portions may be permitted to operate, while maintaining compliant with The United States National Electric Code. The United States National Electric Code maintains that in the event that an EPO protocol is executed, the back-up batteries should be shut off within five minutes.

In some examples, EPO systems may include an EPO manager that may detect emergency events and send an EPO signal to several EPO devices that may each monitor an energy storage device of a computing device. As described herein, an "energy storage device" can, for example, refer to a device that may be used to power, or store energy to power a different electrical or mechanical device. In some examples, an energy storage device may provide back-up power to a computing device. As used herein, a "computing device" can, for example, refer to a server, and/or another machine for computing or processing data. As used herein, the term "EPO signal" can, for example, refer to an indication that is provided to an EPO device indicating an EPO event. In some examples, the EPO signal may be a power signal, a voltage, a current, and/or another indication means. The EPO signal may be provided by the EPO manager to indicate that an emergency event has occurred and instruct the energy storage devices to power down by physically disconnecting and/or connecting an electrical connection to the device. In some examples, the EPO manager may be a safety device that is deployed (e.g. implemented) by a user when an emergency event occurs and power (e.g. back-up power from an energy storage device) to several devices should be removed from power. For example, a user and/or monitoring system may initiate an emergency protocol via the EPO manager, and the EPO manager may transmit an EPO signal to several EPO devices. In this example, each EPO device is communicatively connected to a device (e.g. a computing device).

In some examples, a back-up battery is located external to the equipment that it powers. For example, an uninterruptible power supply (UPS) is used to provide emergency power to a load when the input power source and/or main power fails. For example, an EPO device can include an interface directly connected to an external back-up energy supply (e.g. a UPS) to abort operation of the back-up energy supply in the event of an EPO protocol, and/or during a similar event. In some examples, the UPS may have an EPO interface such that the UPS may be powered down in the event of an emergency. In this example, the EPO may have an interface directly connected to the UPS by a connector. In some examples, a back-up energy storage device (e.g. a back-up battery) may be included in the internal portions of the electronic equipment (e.g. a computing device).

The internally located back-up energy storage (e.g. an energy storage device) may have limited use because the US National Electric Code maintains that to be compliant, an EPO device should be connected and operational for each energy storage device to operate for a period of time longer than five minutes. In the event of sudden power loss, an energy storage device may provide back-up power for longer than five minutes when connected to an EPO device. The direct connection of an EPO device to the internally located energy storage device can be difficult when the electronic device (e.g. a computing device) has limited space available for a dedicated EPO interface.

In some examples, the energy storage device may be located within the internal portions of a computing device to provide power to computing components. For example, a computing device (e.g. a server) may utilize an internally located back-up energy storage device to provide power to the computing components in the event of a sudden loss of power to the computing device. In some examples, the computing device may utilize the back-up power to prevent data loss, business disruption, and/or power electronic machines/equipment until they may be shut down and/or power restores. In this example, for the operation of the back-up energy storage device to be compliant with the US National Electric Code, it should have an EPO device designated to the energy storage device to power down the energy storage device in the incidence of an EPO event. In some examples, computing devices may not have space available to install a dedicated connector (e.g. an EPO interface, a four or six prong connector, etc.) for a EPO device.

For example, computing devices may already include ports that are utilized to provide input and/or output for the computing device. For example, a computing device (e.g. a server), may include several non-EPO ports. As used herein, the term "non-EPO port" can, for example, refer to display ports, network ports, serial ports, an expansion card ports (e.g. a PCI port), Universal Serial Bus (USB) ports, and/or other types of ports that may be utilized to provide a connection to the computing device. Some non-EPO ports are communicatively connected to a compute manager of a computing device and others may be communicatively connected to the system manager, and some non-EPO ports may be communicatively connected to both. As used herein, the term "system manager", can, for example, refer to a controller of a computing device which may control the operations and/or power allocation of the computing components of a computing device. The system manager may also store memory resources that include instructions to be executed by processor(s). As used herein, the term "compute manager" can, for example, refer to a controller that may manage data processing and computational data flow. In this example, the non-EPO ports may be previously installed on the computing device leaving little room for new ports that may be dedicated to an EPO device to power down an internally located back-up energy storage device.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

Figure 1:
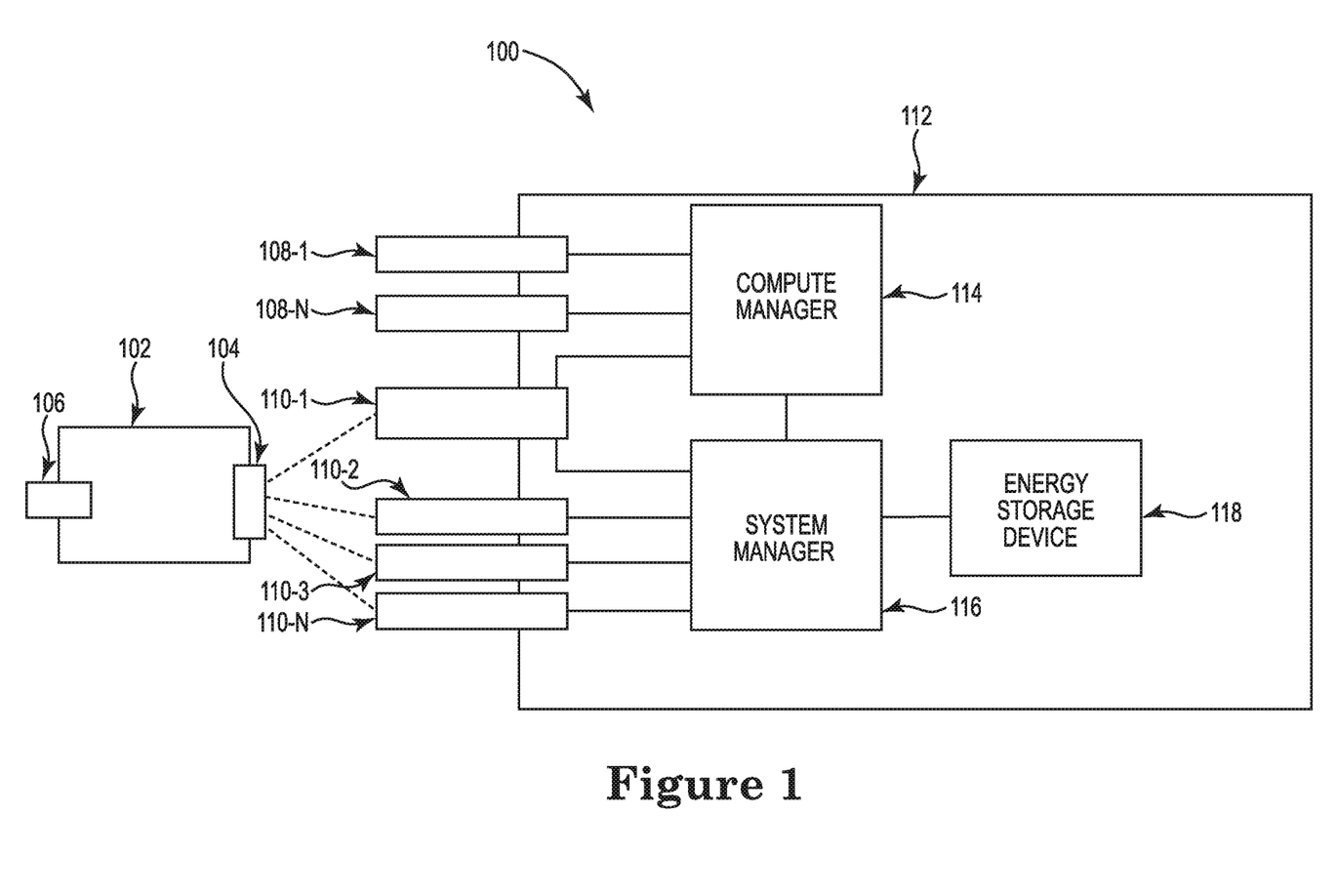
FIG. 1 illustrates an example Emergency Power Off system connected to a computing device consistent with the present disclosure.

FIG. 1 illustrates an example Emergency Power Off system 100 connected to a computing device consistent with the present disclosure. As illustrated in FIG. 1, an Emergency Power Off (EPO) device 102 may be connected to a computing device 112 via a non-EPO ports 110-1, ..., 110-N. In some examples, the non-EPO ports 110-1, ..., 110-N may include a port on the computing device 112 that may accept computing components to provide computing functionality to the computing device 112. The non-EPO ports may be collectively referred to as non-EPO ports 110. The non-EPO ports 110, may be communicatively connected to a system manager 116 of the computing device 112. In some examples, as illustrated by FIG. 1, the non-EPO ports 110 may be communicatively connected to a system manager 116 and/or a compute manager 114.

As described herein, the system manager 116 may provide administrative operation to the computing device 112 and include functionality to direct power allocation from an internally located energy storage device 118. As described herein, the energy storage device 118 may be a back-up battery system to provide power to computing components in the event of a loss of power. For example, the system manager 116 may instruct the energy storage device 118 to provide power to computing components in response to a loss of power (e.g. a loss of power from a main power source). In some examples, the EPO device 102 may be coupled to non-EPO ports 110 to make the computing device 112 compliant and allow the computing device 112 to discharge the energy storage device 118 for a period of time that is longer than five minutes. In some examples, the EPO device 102 may be compliant without changing the existing architecture of the computing device 112 by connecting to the non-EPO ports 110.

As illustrated in FIG. 1, the non-EPO ports 110 may already exist on the computing device 112. As described herein, the non-EPO ports 110 may be an existing port of a computing device 112, (e.g. a server), such as: display ports, network ports, serial ports, Peripheral Component Interconnect (PCI) ports, Universal Serial Bus (USB) ports, and/or other types of ports that may be utilized to provide a connection to the computing device 112. In some examples, the non-EPO ports 110 may be communicatively connected to the system manager 116 and/or to the compute manager 114.

In other examples, non-EPO ports 110 may be ports that receive a printed circuit assembly (e.g. a riser card). As used herein, the term "printed circuit assembly" can, for example, refer to a device to mechanically support and electronically connect electronic components and/or electric components. For example, the non-EPO port 110-1, illustrated by FIG. 1, may be an expansion card port (e.g. a PCI port) and the EPO device 102 may be a printed circuit assembly (e.g. a riser card) to provide an EPO signal to the system manager 116 and/or the compute manager 114. In the preceding example, a computing device 112 may be compliant by utilizing existing non-EPO ports 110 of the computing device 112 by connecting and powering an EPO device 102 to the existing non-EPO ports 110. In this way the EPO device 102 utilizes existing hardware of the computing device 112.

In other examples, the non-EPO ports 110 may be communicatively connected to the system manager 116 and to an EPO device 102. For example, non-EPO port 110-2 may be a display port (e.g. a HDMI port) to connect to a display computing component and the computing device 112 can project images on the display coupled to the display port (e.g. VGA, HDMI, etc.). The existing non-EPO ports 110 may inhibit the installation of a dedicated EPO device interface to the computing device 112. In some examples, an EPO device 102 may connect to the non-EPO ports 110 with a first connector end 104 of the EPO device 102.

For example, the EPO device 102 can include a first connector end 104 and a second connector end 106. The first connector end 104 can be a male connector end and/or a female connector end that can be coupled to the non-EPO ports 110. The second connector end 106 can also be a male connector end and/or a female connector end which may receive (e.g. couple to) a connector of an electric device (e.g. a computing component) that may utilize the non-EPO ports 110. In some examples, the second connector end 106 of the EPO device 102 may connect to a computing component, and the first connector end of the EPO device 102 may connect to the non-EPO ports 110, such that the non-EPO ports 110 may simultaneously provide a connection to the computing component and the EPO device 102. As used herein, the term "simultaneously" can, for example, mean that the non-EPO ports 110 may provide a connection to the system manager 116 for both a computing device coupled to the EPO device 102, and the EPO device 102 itself. In some examples, the EPO device 102 may provide (e.g. transmit) an EPO signal via the non-EPO port 110-2 (e.g. the display port) to the system manager 116 and the system manager 116 may instruct the energy storage device 118 to power down in response to the EPO signal.

In some examples, the non-EPO ports 110 may simultaneously connect a computing component and the EPO device 102. For example, the EPO device 102 may connect a computing component (an HDMI device) to a port on a second connector end 106 and connect to a non-EPO port 110-2 (e.g. a display port) such that the system manager 116 may receive a signal from the HDMI computing component and/or an EPO signal from the EPO device 102. In some examples, the non-EPO port 110-2 may not have power directed to it from the computing device 112. For example, the EPO device 102 may be connected to the non-EPO port 110-2 which may be a port that is not powered (e.g. a display port, a VGA port, an Ethernet port, etc.) by the computing device 112. In this example, the EPO device 102 may requisition power from a second non-EPO port 110-1 which is powered by the computing device 112 and the EPO device 102 requisitions power via a cord and/or a wire connected to the first connector end 104 and/or the second connector end 106. Similar to the previous example, the EPO device may also requisition power by utilizing a power cord coupled to a power supply. The first connector end 104 and the second connector end 106 are discussed herein in detail in conjunction with FIG. 2.

In some examples, the computing device 112 may include non-EPO compute port(s) 108-1, . . . , 108-N which may connect to a compute manager 114. The non-EPO compute ports may be collectively referred to as non-EPO compute ports 108. For example, the EPO device 102 may connect to non-EPO compute ports 108 in a similar manner as described above when connected to non-EPO ports 110. In this example, the compute manager 114 may receive an EPO signal from the EPO device 102 via non-EPO compute ports 108 and the compute manger 114 may transmit the EPO signal to the system manager 116. While the examples described herein focus on the communication between the EPO device 102 and the non-EPO ports 110, it should be understood that the EPO device 102 may operate in the same manner via non-EPO compute ports 108.

In some examples, the EPO device 102 may include circuitry to communicate EPO events to the system manager 116. As used herein, the term "EPO event" can, for example, refer to an emergency incident (e.g. an event trigger) where electronic devices (e.g. computing devices) should be removed from a power source. In some examples, the EPO signal can be triggered by the EPO event referred herein as an event trigger. As used herein, the term "event trigger" can, for example, refer to an event which occurred that initiates the transmission of an EPO signal from the EPO manager to the EPO device 102. In some examples, the event trigger may be an emergency situation, and in other examples, the event trigger may be an indication that the computing device 112 is no longer compliant. For example, the computing device 112 may no longer be compliant when the EPO device has lost power and can no longer provide an EPO signal to the system manager 116, and/or when the EPO device 102 has been disconnected from the computing device 112. In some examples, the circuitry included in the EPO device 102 may be a controller to receive and provide EPO signals to the computing device 112.

For example, the system manager 116 may receive an EPO signal provided (e.g. transmitted) by the EPO device 102 in response to the EPO device 102 receiving an EPO signal. In another example, the EPO device 102 may include a controller logic to monitor for an EPO signal and provide (e.g. transmit) the EPO signal via the non-EPO ports 110 to the system manager 116. For example, when the computing device 112 has experienced a loss of power (e.g. a main power loss), the system manager 116 may instruct the energy storage device 118 to provide power to computing components. Continuing with the preceding example, the EPO device 102 may receive an EPO signal and the controller of the EPO device 102 may transmit the EPO signal via the non-EPO ports 110 to the system manager 116. In this example, the EPO signal received by the system manager 116 may include instructions to power down the energy storage device 118. The process described in this example is described in further detail in conjunction with FIG. 3.

In other examples, the system manager 116 of the computing device 112 may probe the EPO device 102 for EPO events. For example, the system manager 116 of the computing device 112 may periodically probe the EPO device 102 to confirm that the EPO device 102 is connected via the non-EPO ports 110 and operational such that the energy storage device 118 and computing device 112 remain compliant. In other examples, the system manager 116 may periodically probe the EPO device to check for a status change of the EPO device. As used herein, the term "status change" can, for example, refer to a change in the EPO device 102 condition. For example, the EPO device 102 may include circuitry that may experience a short circuit and/or an open circuit in response to the receipt of an EPO signal (e.g. a voltage). When the system manager 116 probes the EPO device 102 connected via the non-EPO ports 110, the system manager 116 may detect the status change (e.g. the short circuit) and instruct the energy storage device 118 to power down. In another example, the status change may be a disconnected EPO device 102 (e.g. a non-compliant status). In this example, the disconnect of the EPO device 102 may indicate that the EPO device 102 has been removed from the system, and/or indicate that the EPO device 102 has lost power. In some examples, the frequency of the probe by the system manager 116 may increase when the energy storage device 102 is powering the computing components. For example, the system manager 116 may increase the frequency of the probe (e.g. to confirm a connection) to the EPO device 102 when the computing device 112 has experienced a loss of main power and the energy storage device 118 is utilized to provide power to the computing components. The process described in this example is described in further detail in conjunction with FIG. 4.

In the preceding examples, the computing device 112 may be compliant with the US National Electric Code by utilizing existing non-EPO ports 110 of a computing device 112 to communicatively connect a EPO device 102. In the preceding examples, the EPO device 102 eliminates the demand for new hardware by utilizing existing hardware of the computing device 112 thereby attaining a compliance without taking computing space away from another computing component by utilizing existing architecture.

Figure 2:
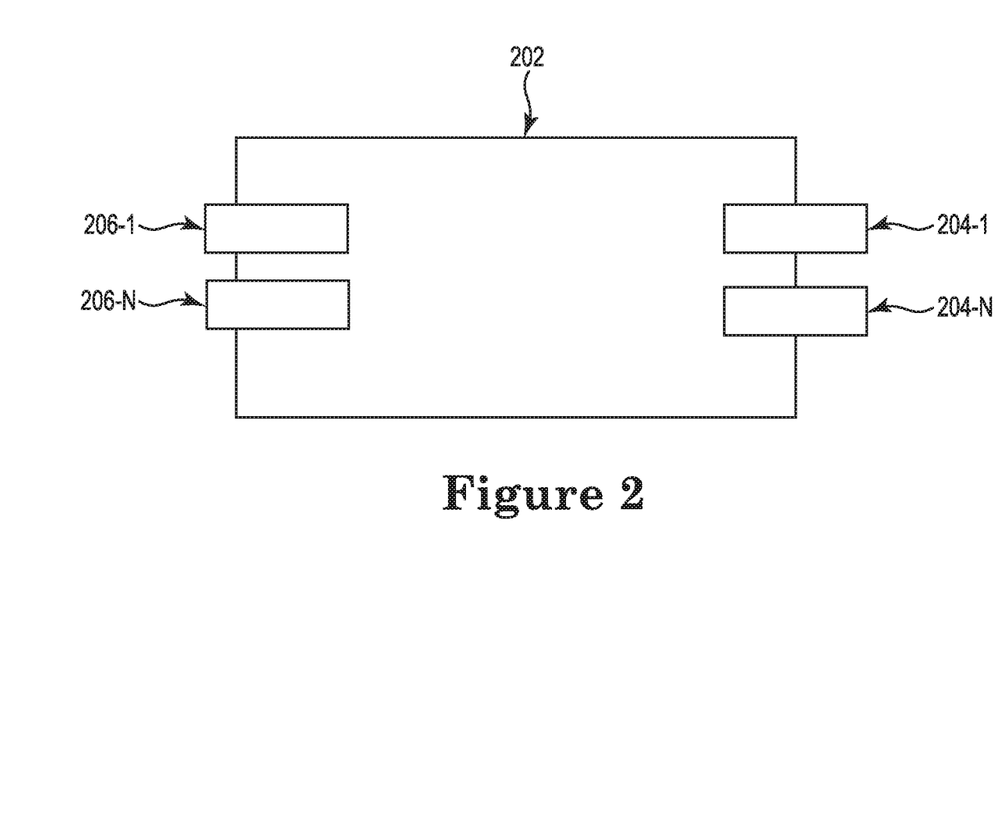
FIG. 2 illustrates an example Emergency Power Off device consistent with the present disclosure.

FIG. 2 illustrates an example Emergency Power Off device 202 consistent with the present disclosure. The EPO device 202 can be the same or similar to the EPO device 102 of FIG. 1 and may include similar elements. As illustrated by FIG. 2, the EPO device 202 may include a port(s)/and or plugs on a first connector end 204-1, . . . , 204-N that may connect to non-EPO ports (e.g. non-EPO ports 110), and port(s) on a second connector end 206-1, . . . , 206-N that may connect to a computing component. The ports on the first connector end 204-1, . . . , 204-N and the second connector end 206-1, . . . , 206-N may be collectively referred to as the ports of first connector end 204 and the ports of the second connector end 206.

In some examples, the non-EPO ports simultaneously provides a connection to the computing component and the EPO device 202. For example, the EPO device 202 may connect to the computing device (e.g. computing device 112) with ports on the second connector end 206 and connect to the non-EPO port of a computing device with ports on the first connector end 204. In some examples, the EPO device 202 may include ports that are compatible with male and/or female connectors. As used herein, the term "female connector" can, for example, refer to a connector attached to a wire, cable, or piece of hardware, having one or more recessed portions with electrical terminals inside, and constructed in such a way that a plug with exposed conductors (e.g. a male connector) can be inserted into the recessed portion to provide a physical and/or electrical connection. An example of a male connector is a jack. As used herein, the term "male connector" can, for example, refer to a connector attached to a wire, cable, or piece of hardware, having one or more exposed, unshielded electrical terminals, and constructed in such a way that it can be inserted into a recessed portion (e.g. a female connector) to provide a physical and/or electrical connection. An example of a male connector is a plug.

For example, the non-EPO ports may be a female port (e.g. a jack that accepts a USB device plug), and a first port on the first connector end 204-1 may be a male port (e.g. the USB device plug) to communicatively connected to a first non-EPO port. Continuing with this example, when the first non-EPO port does not include a power source, a second port on the first connector end 204-N may include a male port and/or cord to connect to a second non-EPO port that may include power. While the preceding example described the EPO device 202 as having male ports on the first connector end 204 it should be understood that the EPO device 202 may have female and/or male ports and combinations thereof. In some examples, the ports on the second connector end 206 may also include both male and female ports and combinations thereof. For example, the EPO device 202 may include ports on the second connector end 206 that may be a male port, a female port or a combination thereof to receive a computing device. In this example, the non-EPO port, may simultaneously communicatively connect the computing component and the EPO device 202 to the computing device and/or the system manager (e.g. the system manager 116).

In this way, as described in the preceding examples, the EPO device 202 may provide various arrangements of plugs and jacks to accommodate computing devices and power compliance utilizing existing architecture. As described in the preceding examples, the EPO device 202 provides a compliance to US National Electric Code by connecting to a computing device and/or the system manager without sacrificing computing components, space on the computing device (e.g. a server) or altering the existing architecture of the computing device.

Figure 3:
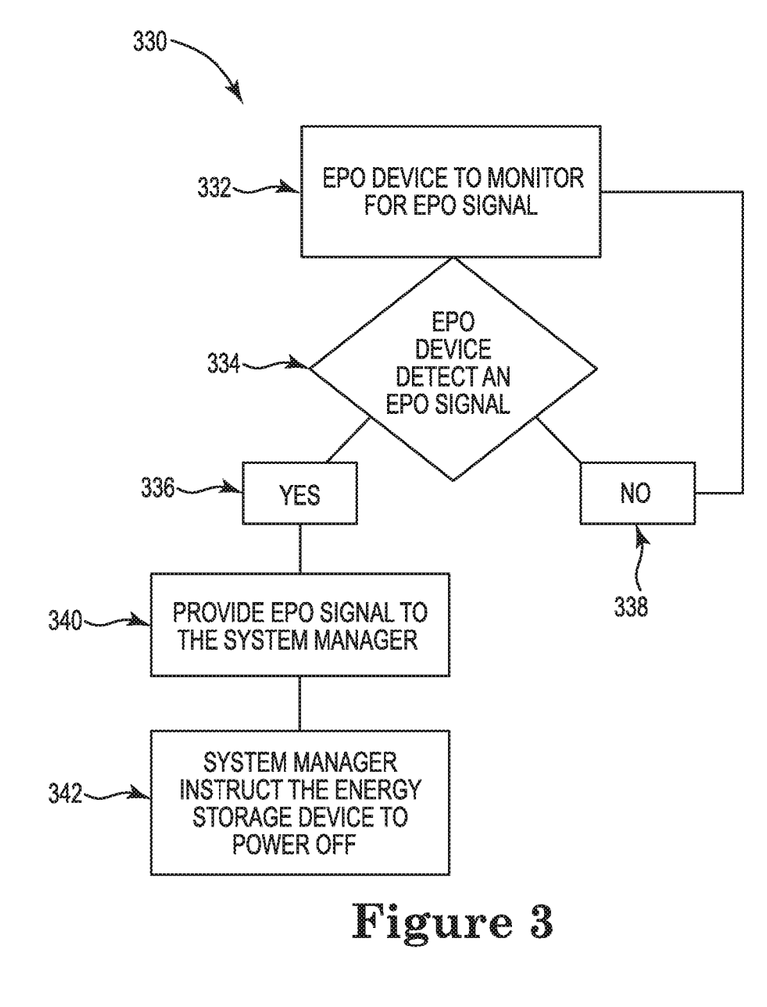
FIG. 3 illustrates an example flow diagram for an Emergency Power Off system consistent with the present disclosure.

FIG. 3 illustrates an example flow diagram for an Emergency Power Off system consistent with the present disclosure. The EPO system 330 may include similar elements as previously described in conjunction with FIGS. 1 and 2. As illustrated in FIG. 3, block 332 describes an EPO device (e.g. the EPO device 102) that is connected to a non-EPO port (e.g. the non-EPO ports 110). For example, as illustrated in block 332, the EPO device may include a controller such that the EPO device may monitor for an EPO signal in response to an event trigger. As used herein, the term "monitor" can, for example, refer to when the EPO device periodically may check for an EPO signal and/or an event trigger. For example, the EPO device may comprise a circuitry logic (e.g. a controller) to send a signal to an EPO manager or similar device that may monitor for EPO events for several EPO devices each corresponding to a computing device (e.g. computing device 112 in a data center), to check if an event trigger has occurred.

In other examples (e.g. block 334), the EPO device may monitor for an EPO signal by passively detecting an EPO signal in response to an event trigger. For example, the EPO device may receive an EPO signal sent to the EPO device in response to an EPO event, and the controller included in the EPO device may transmit the signal through the non-EPO ports (e.g. the non-EPO ports 110) at block 340 to a system manager (e.g. the system manager 116). For example, as illustrated in FIG. 3, at block 334, if the EPO device determines that an EPO signal has been detected, (e.g. block 336 "Yes"), the EPO device may transmit the EPO signal via the non-EPO ports to the system manager. In this example, the system manager 116 may transmit instruction to an energy storage device (e.g. the energy storage device 118) to power off all computing components that were receiving power.

Continuing with the description of system 330, at block 334, if the EPO device does not detect an EPO signal (e.g. block 338 "no"), the EPO device may revert back to monitoring for an event trigger. For example, the EPO device may comprise a circuitry logic (e.g. a controller) to send a signal to an EPO manager or similar device that may monitor for EPO events for several devices, to check if an event trigger has occurred. When the EPO device determines that an EPO event has not occurred the EPO device may return to monitoring for an EPO signal similar in operation to block 332. Regardless if the EPO device detects and transmits a signal via the non-EPO ports to the system manager, the connection to the computing device allows the internally located energy storage device to be compliant with US National Electric Code.

In the preceding examples, illustrated in FIG. 3 the computing device may be compliant with US National Electric Code because the EPO device includes a controller to recognize and transmit an EPO signal to the system manager via non-EPO ports. The system manager may instruct an energy storage device to power off any computing components in response to the received EPO signal. In this manner, the EPO device may provide compliance to the computing device without taking computing space away from another computing component by installing a dedicated EPO port, but rather utilizing existing architecture via the non-EPO ports.

Figure 4:
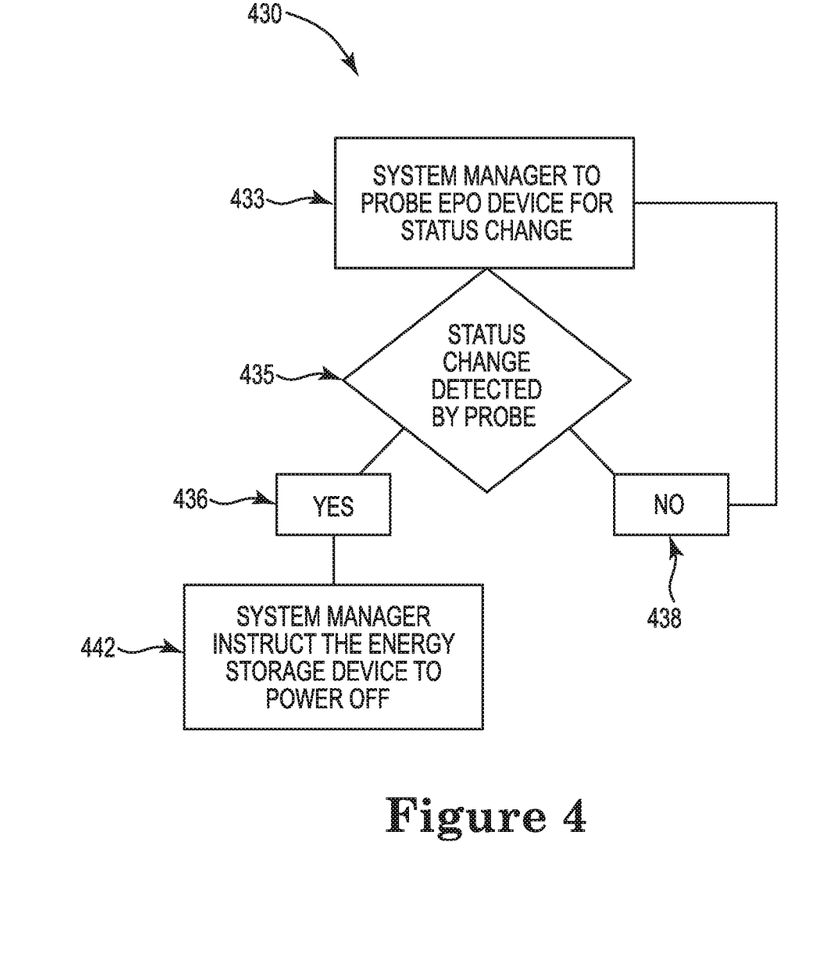
FIG. 4 illustrates an example flow diagram for an Emergency Power Off system consistent with the present disclosure.

FIG. 4 illustrates an example flow diagram for an Emergency Power Off system consistent with the present disclosure. The EPO system 430 may include similar elements as previously described in conjunction with FIGS. 1 and 2. As illustrated in FIG. 4, block 433 describes an EPO device (e.g. the EPO device 102) that may be connected to a non-EPO port (e.g. the non-EPO ports 110) that may be periodically probed by a system manager (e.g. the system manager 116). For example, as illustrated in block 433, the EPO device 102 may include circuitry logic to receive an EPO signal (e.g. a voltage) from an EPO manager or similar device that may monitor for EPO events for several EPO devices each connected to a computing device (e.g. akin to computing device 112) and provide an EPO signal to the EPO device. In some examples, the system manager may increase the frequency of the periodic probe of the EPO device.

For example, the system manager may increase the frequency in which it probes the EPO device when the computing device has lost a main source of power. In this example, the system manager may instruct energy storage device to power the computing components of the computing device, and the system manager may increase the frequency of the probe to the EPO device to confirm a compliance (e.g. a connection of the EPO device). In this example, the system manager may instruct the energy storage device to provide back-up power to the computing device for a period of time longer than five minutes, and/or until the system manager detects an EPO signal received by the EPO device. In some examples, the system manager may detect a status change of the EPO device at block.

For example, at block 435, the periodic probe by system manager may detect a status change of the EPO device (e.g. block 435 "yes"). The change in status may be that of a blown and/or an open fuse from the receipt of an EPO signal (e.g. a voltage). In this example, the computing device may be compliant with US National Electric Code because the EPO device may receive the EPO signal and the system manager may be alerted by periodically probing the EPO device via the non-EPO ports that an EPO event has occurred and may instruct an energy storage device to immediately stop powering the computing device. In another example, the periodic probing of the EPO device by the system manager via the non-EPO ports may determine a status change when the EPO device is not present or is not connected to the non-EPO ports. In this example, the computing device would not be in compliance with the US National Electric Code, and the internal storage device may not be utilized to power any component using greater than 750 VA for a period of time longer than five minutes. In this example, the system manager may execute instructions to reestablish compliance and/or alert a user of non-compliance. In some examples, the probe may not detect a status change.

For example, as illustrated by block 438, the probe at block 435 may not detect a status change. For example, the system manager may periodically probe the EPO device and determine that the EPO device is connected to the non-EPO ports 110 (e.g. is compliant) and the circuitry logic of the EPO device may indicate that there has not been an EPO signal received. In this example, the system manager 116 may not detect a short circuit and/or an open circuit and will return to operations as described at block 433.

In the previous examples, as illustrated in FIG. 4, the EPO device may provide compliance to the computing device by passively connecting to the non-EPO ports and the system manager may periodically probe the EPO device to detect a status change. In these examples, the EPO device may provide a compliance without taking computing space away from another computing component by installing a dedicated EPO interface (e.g. a port), but rather utilizing the existing architecture of the computing device.

Figure 5:
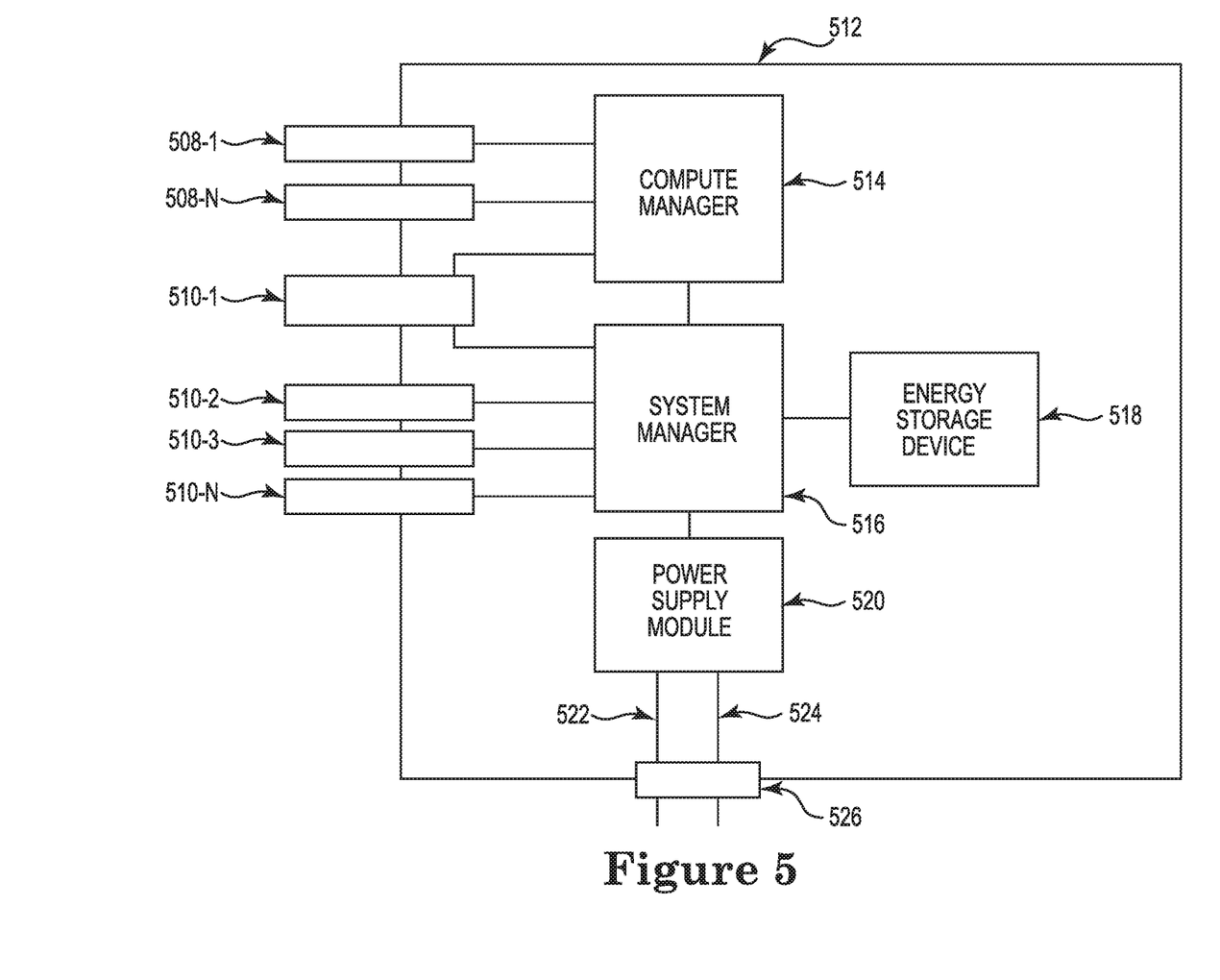
FIG. 5 illustrates an example Emergency Power Off system consistent with the present disclosure.

FIG. 5 illustrates an example Emergency Power Off system consistent with the present disclosure. The system 500 includes elements similar to those described herein in conjunction with FIG. 1. The system 500 includes an EPO device 524 that may be co-packaged with a power cord 522. As used herein, the term "co-packaged" can, for example, refer to one or more devices may be packaged together into one element. For example, the EPO device 524 may be a wire that is packaged together (e.g. co-packaged) with the power cord 522 to provide an EPO signal and power to a computing device 512 via a non-EPO power port 526. In some examples, the computing device 512 may include a power supply module 520 that may be connected to a system manager 516. For example, the power supply module 520 may provide physical containment for several power components of the computing device 512. In some examples, although not expressly illustrated, the power supply module 520 may include the energy storage device 518. In other examples, the power supply module 520 may receive an EPO signal from the EPO device 524 via the non-EPO power port 526.

For example, the EPO device 524 may transmit an EPO signal in response to an event trigger to the power supply module 520 via the non-EPO power port 526. In this example, the power supply module 520 may provide (e.g. transmit) the EPO signal to the system manager 516, and the system manager 516 may instruct the energy storage device 518 to stop providing power to the computing components. In this manner, the EPO device 524 may provide compliance to the computing device 512 without taking computing space away from another computing component by installing a dedicated EPO port (e.g. an EPO interface), but rather utilizing existing architecture (e.g. the non-EPO power port 526).

The above specification, examples and data provide a description of the method and applications and use of the system and method of the present disclosure. Since many examples can be made without departing from the spirit and scope of the system and method of the present disclosure, this specification merely sets forth some of the many possible example configurations and implementations.

What is claimed:

1. A device, comprising:
   an Emergency Power Off (EPO) device connected to a non-EPO port of a computing device, wherein the EPO device is a wire that is co-packaged with a power cord and the computing device comprises a power supply module connected to a system manager, the EPO device to:
   provide an EPO signal, through the wire and via the non-EPO port, to the system manager connected to an energy storage device of the computing device, wherein the EPO signal comprises instructions to power off the energy storage device, wherein the power supply module transmits the EPO signal to the system manager to power off the energy storage device.

2. The device of claim 1, wherein the EPO device comprises a dedicated power source.

3. The device of claim 2, wherein the dedicated power source is a non-EPO port connection of the computing device.

4. The device of claim 1, wherein the non-EPO port is one of:
   an expansion card port;
   a display port;
   a serial port; and
   a network port.

5. The device of claim 1, wherein the non-EPO port simultaneously provides a connection to a computing component and the EPO device.

6. The device of claim 1, wherein the EPO device is a riser card and the non-EPO port is an expansion card port that receives the riser card.

7. A computing device, comprising:
   a system manager connected to an energy storage device;
   an Emergency Power Off (EPO) device connected to the system manager via a non-EPO port, the system manager is to:
   determine when an EPO signal has been sent to the EPO device; and
   detect a status change of the EPO device via the non-EPO port, wherein the system manager transmits instructions to power off the energy storage device in response to detecting the status change of the EPO device, and wherein the status change is an indication that the EPO device has been disconnected from the non-EPO port.

8. The computing device of claim 7, wherein the EPO device comprises a controller to communicate an event trigger and the status change of the EPO device to the system manager through the non-EPO port.

9. The computing device of claim 7, wherein the system manager probes the EPO device for the status change.

10. A system, comprising:
    a computing device comprising a system manager connected to an energy storage device, and a plurality of non-Emergency Power Off (EPO) ports, wherein the computing device comprises a power supply module connected to the system manager;

an EPO device connected to a non-EPO port of the plurality of non-EPO ports, wherein the EPO device is a wire that is co-packaged with a power cord, the EPO device to:
  detect an EPO signal sent to the EPO device in response to an event trigger, and
  transmit the EPO signal through the wire via the non-EPO port to the system manager of the computing device; and the system manager to power off the energy storage device in response to receiving the EPO signal from the EPO device via the non-EPO port, wherein the power supply module transmits the EPO signal to the system manager to power off the energy storage device.

11. The system of claim 10, wherein the power supply module transmits the EPO signal to the system manager in response to receiving the EPO signal in response to the event trigger.

12. The system of claim 10, wherein the EPO device connects a computing component to the computing system via the non-EPO port.

* * * * *